C. T. HENDERSON.
MOTOR CONTROLLER.
APPLICATION FILED NOV. 2, 1914.
1,176,829.
Patented Mar. 28, 1916.
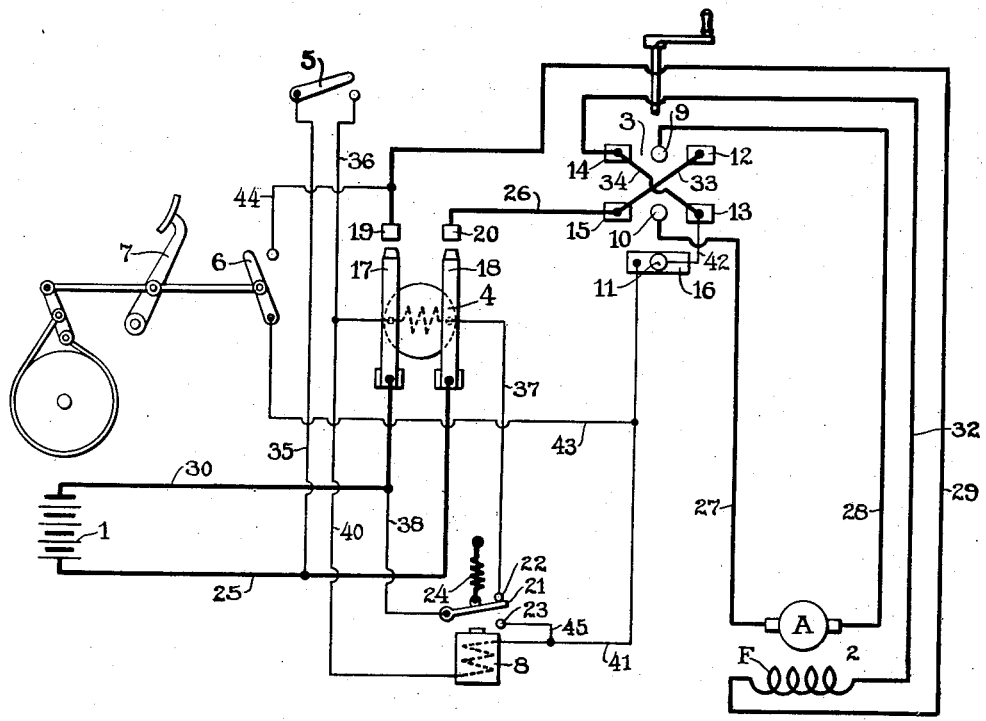
Witnesses
J. L. Johnson
H. Watson
Inventor
Clark T. Henderson
By Fraulett Hubbard
Attorney

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,176,829.   Specification of Letters Patent.   Patented Mar. 28, 1916.

Application filed November 2, 1914. Serial No. 869,838.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to motor controllers.

Controllers embodying the invention are particularly advantageous for electric vehicles but are not limited to such application.

The various objects of the invention and the advantages thereof for the aforesaid and other purposes will be apparent from the embodiment thereof diagrammatically illustrated in the accompanying drawing and now to be described.

It is, of course, understood that the invention may be embodied in other forms falling within the scope of the appended claims.

The controller illustrated is particularly designed for electric vehicles and for simplicity of illustration the accelerating and speed regulating parts thereof have been omitted. Thus, as is customary in electric vehicles, a storage battery 1 is provided to supply current to the motor 2 which for illustration is provided with an armature A and a series field winding F.

The controller includes a manually operable reverse switch 3, an electro-responsive double-pole switch 4 to control the continuity of the motor circuit, a manual master switch 5 to energize and deënergize the switch 4 at will, a control switch 6 operable by a brake lever 7 and an electro-responsive relay switch 8 controlled by both the switch 6 and the reverse switch 3 to deënergize the main switch 4. Also, as will be hereinafter more fully set forth, the relay switch 8 functions to insure against energization of main switch 4 by means other than the master switch 5 and if said master switch is closed when said main switch is deënergized to necessitate opening and reclosure thereof to again energize the same. Further, the relay insures against energization of the main switch except when the reverser is set for operation in one direction or the other.

The reverser 3 is illustrated as provided with three contact fingers 9, 10, and 11 and five movable contact segments 12, 13, 14, 15 and 16. The segments 12 to 15 are divided into two cross connected sets movable to engage fingers 9 and 10. More specifically, when moved to the right segments 14 and 15 engage fingers 9 and 10 respectively, whereas upon movement to the left segments 12 and 13 engage fingers 9 and 10 respectively. Segment 16 is so arranged with respect to the remaining segments as to engage finger 11 in the off position of the reverser before the other segments disengage their respective fingers and to disengage said finger upon movement of the reverser to either of its operative positions.

Switch 4 is of conventional form having two electrically independent contact arms 17 and 18 to engage contacts 19 and 20 respectively, while the switches 5 and 6 are of the conventional, single pole, type. The switch 6 is so connected to the brake lever 7 as to be closed upon movement of said lever to apply the vehicle brake.

The relay switch 8 has a pivoted contact arm 21 movable between and into engagement with stationary contacts 22 and 23 and is normally biased by suitable means, such as a spring 24, into engagement with contact 22. Upon response of the relay switch its arm 21 is disengaged from contact 22 and attracted into engagement with contact 23.

The power circuits are as follows: With the switch 4 closed and the reverser 3 set with segments 14 and 15 in engagement with fingers 9 and 10 current would flow from one terminal of the battery by conductor 25 through contacts 18 and 20 of main switch 4, by conductor 26 through segment 15 and finger 10 of the reverser, by conductor 27 through the motor armature from left to right, by conductor 28 through reverser finger 9 and segment 14 by conductor 32 through field F, by conductor 29 through contacts 19 and 17 of main switch 4, by conductor 30 to the opposite terminal of the battery. On the other hand, with the reverser set to effect engagement between segments 12 and 13 fingers 9 and 10, the motor field circuit would remain the same but the current through the armature would be reversed. Under such conditions current would flow from conductor 26 by cross conductor 33 connecting reverser segments 15 and 12 to finger 9, by conductor 28 to and through the armature from right to left, by conductor 27 to reverser finger 10 and segment 13, by cross conductor 34 to reverser segment 14 and thence through the field as already traced. Thus it will be observed that the motor would be started in a reverse direction to that previously described.

In connection with the aforesaid power circuits it will be noted that both the reverser and the main switch 4 must be closed to complete the motor circuit so that the motor circuit may be interrupted by either said reverser or said main switch independently of the other. Thus should the main switch 4 for any reason fail to open upon deenergization thereof the reverser provides for positively and quickly interrupting the motor circuit, which is obviously highly advantageous, especially in the control of electric vehicles.

As before stated, the main switch 4 may be energized at will by closing the master switch 5. This switch completes circuit from one terminal of the battery by conductors 25, 35 and 36 to and through the winding of switch 4, by conductor 37 through contacts 22 and 21 of relay switch 8, by conductors 38 and 30 to the opposite side of the battery. With these connections it is obvious that the switch 4 may be deenergized at will by opening switch 5. Also, as above stated, the main switch 4 may be deënergized at will by either the reverser 3 or brake switch 6. First considering the reverser, the same when moved to off position establishes a circuit through the switch 5 to conductor 36 as already traced, by conductor 40 through the winding of relay 8, by conductor 41 to reverser finger 11 and segment 16, by conductor 42 to segment 13, by conductor 34 to segment 14 to the left hand side of main switch 4 as already traced. Thus with the main and master switches closed relay 8 would respond thereby separating its contacts 21 and 22 and consequently interrupting the energizing circuit of switch 4. Switch 4 would thereupon be free to open and upon opening would interrupt the motor circuit. Further, by reason of the proportions and arrangement of reverser contact 16, as above described, the main switch 4 would be deënergized before the motor circuit was interrupted by the reverser contacts. Thus under ordinary conditions the reverser is relieved of the arcing resulting from interruption of the motor circuit but in an emergency it would open the motor circuit independently of the switch 4 and take the resulting arcing. Switch 6 when closed acts similarly to the reverser to complete the energizing circuit of the relay as already traced from one terminal of the battery through switch 5 and through said relay, and thence by conductors 41, 43 and 44 to the main switch; by conductor 30 to the opposite side of the battery. Hence switch 6 provides means whereby the motor circuit may be interrupted in applying the vehicle brake.

In addition to providing for deënergization of the main switch 4, the relay switch 8 functions as follows: Upon response either to the reverser or to the brake switch, said relay completes for itself a maintaining circuit through the master switch 5 thus maintaining its contact 21 out of engagement with contact 22. This maintaining circuit may be traced from one terminal of the battery by conductors 25 and 35 through switch 5, by conductors 36 and 40 through the winding of relay switch 8, by conductor 45 through contacts 23 and 21 of said relay, by conductors 38 and 30 to the opposite terminal of the battery. Hence, whenever the relay is energized to effect interruption of the motor circuit it remains energized until the switch 5 is opened and thereby positively insures against reënergization of the main switch 4 by subsequent operation of either the reverser 3 or the brake switch 6. In other words, it insures against subsequent energization of switch 4 except by opening and reclosing of the master switch 5, and furthermore insures against energization of said switch 4 except when the reverser is in one of its operative positions.

It will thus be observed that the motor may be stopped in three ways, including two by hand and one by foot, but must always be started by operation of the master switch. This obviously provides a very convenient and safe form of control through the medium of a very simple and comparatively inexpensive apparatus.

What I claim as new and desire to secure by Letters Patent is:

1. In a motor controller, in combination, a master switch, a separate manual reversing switch, and a power operated main switch controllable by said master switch to close and open the motor circuit and also controllable by said reversing switch but only to open the motor circuit.

2. In a motor controller, in combination, a master switch, a separate manual reversing switch, a power operated main switch controllable by said master switch for closing and opening the motor circuit, and means rendering said power operated switch subject to control by said reversing switch for opening the motor circuit but insuring against its control by said reversing switch to reclose the motor circuit.

3. In a motor controller, in combination, a master switch, a separate manual reversing switch, a power operated main switch controllable by said master switch for closing and opening the motor circuit, and means rendering said power operated switch subject to control by said reversing switch for opening the motor circuit but insuring against its control by said reversing switch to reclose the motor circuit and also insuring against reclosure of said main switch except when said reversing switch is in an operative position.

4. In a motor controller, in combination, a power operated main switch controlling the continuity of the motor circuit, a master switch for directing operation of said main switch to close and open the motor circuit at will, a separate manual reversing switch and means controlled by said reversing switch to trip said main switch, said means thereupon remaining effective until subsequent operation of said master switch.

5. In a motor controller, in combination, a power operated main switch controlling the continuity of the motor circuit, a master switch for directing operation of said main switch to close and open the motor circuit at will, a separate manual reversing switch and means controlled by said reversing switch to trip said main switch, said means thereupon remaining effective until subsequent operation of said master switch and insuring against reclosure of said main switch until said reversing switch is reset.

6. In a motor controller, in combination, an electro-responsive main switch, a master switch for energizing and deënergizing the same to respectively complete and interrupt the motor circuit, a manual reversing switch operable independently of said master switch and an electro-responsive relay switch responsive to movement of said reversing switch to deënergize said main switch and to establish a maintaining circuit for itself independent of said reversing switch.

7. In a motor controller, in combination, an electro-responsive main switch, a master switch for energizing and deënergizing the same to respectively complete and interrupt the motor circuit, a manual reversing switch operable independently of said master switch and an electro-responsive relay switch responsive to movement of said reversing switch to deënergize said main switch and to establish a maintaining circuit for itself independent of said reversing switch and under the control of said master switch.

8. In a controller for electric motor vehicles, in combination, a power-operated main switch controlling the continuity of the motor circuit, a master controller for directing operation thereof to close and open the motor circuit, a separate manual reversing switch, a switch associated with a brake operating mechanism of the vehicle and common means controlled by said reversing switch and said brake switch to direct operation of said main switch to interrupt the motor circuit and thereupon remove said main switch from the influence of said reversing switch and said brake switch.

9. In a controller for electric motor vehicles, in combination, a power-operated main switch controlling the continuity of the motor circuit a master controller for directing operation thereof to close and open the motor circuit, a separate manual reversing switch, a switch associated with a brake operating mechanism of the vehicle and common means controlled by said reversing switch and said brake switch to direct operation of said main switch to interrupt the motor circuit and thereupon remove said main switch from the influence of said reversing switch and said brake switch and to insure against reclosure of said main switch except when said reversing switch is in an operative position.

10. In a controller for electric motor vehicles, in combination, an electro-responsive main switch controlling the continuity of the motor circuit, a master switch for directing operation thereof and means including a manual switch operable independently of said master switch to deënergize said main switch and to interrupt the motor circuit independently of said main switch, said means also restricting the resetting of said main switch to said master switch.

11. In a controller for electric motor vehicles, in combination, an electro-responsive main switch controlling the continuity of the motor circuit, a master switch for directing operation thereof and means including a manual switch operable independently of said master switch to deënergize said main switch and to interrupt the motor circuit independently of said main switch, said means also restricting the resetting of said main switch to said master switch and insuring against resetting of said main switch prior to resetting of said manual switch.

12. In a controller for electric motor vehicles, in combination, an electro-responsive main switch controlling the continuity of the motor circuit, a master switch for directing operation thereof, a manual switch operable independently of said master switch to interrupt the motor circuit independently of said main switch, a switch operable by a brake mechanism of the vehicle and means whereby said manual switch and said brake switch are individually effective to deënergize said main switch for opening the motor circuit but ineffective to energize said main switch.

13. In a controller for electric motor vehicles, in combination, an electro-responsive main switch controlling the continuity of the motor circuit, a plurality of control switches therefor including a master switch, an independently operable reversing switch and a switch operated by a brake mechanism of the vehicle, said master switch being operable to energize and deënergize said main switch and an electro-responsive device responsive to said reversing switch and to said brake switch for deënergizing said main switch and restricting energization of said main switch to said master switch.

14. In a controller for electric motor vehicles, in combination, an electro-responsive main switch controlling the continuity of the motor circuit, a plurality of control switches therefor including a master switch, an independently operable reversing switch and a switch operated by a brake mechanism of the vehicle, said master switch being operable to energize and deënergize said main switch and an electroresponsive device responsive to said reversing switch and to said brake switch for deënergizing said main switch, restricting energization of said main switch to said master switch and necessitating the setting of said reversing switch in an operative position prior to energization of said main switch.

15. In a controller for motor operated vehicles, in combination, a master switch, a separately operable reversing switch, a foot-operated switch, connections whereby all of said switches are individually capable of stopping the driving motor and means restricting restarting to said master switch.

In witness whereof, I have hereunto subscribed my name in the presence of two witnesses.

CLARK T. HENDERSON.

Witnesses:
 TEKLA BAST,
 L. A. WATSON.